US009799954B2

(12) United States Patent
Preradovic et al.

(10) Patent No.: US 9,799,954 B2
(45) Date of Patent: Oct. 24, 2017

(54) APPARATUS WITH MULTI-DIRECTIONAL RADIATION CAPABILITY USING MULTIPLE ANTENNA ELEMENTS

(71) Applicant: Nitero Pty Ltd., Fitzroy, Victoria (AU)

(72) Inventors: Stevan Preradovic, Melbourne (AU); Natalino Camilleri, Cupertino, CA (US); Pat Kelly, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 14/472,824

(22) Filed: Aug. 29, 2014

(65) Prior Publication Data

US 2016/0064816 A1 Mar. 3, 2016

(51) Int. Cl.

*H04M 1/00* (2006.01)
*H01Q 3/24* (2006.01)
*H01Q 21/20* (2006.01)
*H01Q 23/00* (2006.01)

(52) U.S. Cl.

CPC ............. *H01Q 3/24* (2013.01); *H01Q 21/205* (2013.01); *H01Q 23/00* (2013.01)

(58) Field of Classification Search

CPC ........ H01Q 3/34; H01Q 13/085; H01Q 13/16; H01Q 1/2266; H01Q 21/0025; H01Q 21/0087; H01Q 21/067; H01Q 25/00; H01Q 3/2605; H01Q 3/2629; H01Q 7/00; H01Q 1/521; H01Q 3/26; H04L 27/36; H04L 27/2626; H04L 27/2647; H04L 25/03343; H04L 27/04; H04L 5/003; H04L 5/1423

USPC ........ 342/118, 200, 365, 368, 372; 343/767, 343/780, 853, 861, 876; 370/252, 297, 370/328, 331; 455/101, 103, 129, 121, 455/226.2, 272, 351, 525, 63.4, 91

See application file for complete search history.

(56) References Cited

U.S. PATENT DOCUMENTS

| | | | | |
|---|---|---|---|---|
| 2012/0064841 | A1* | 3/2012 | Husted | H01Q 21/205 455/78 |
| 2012/0104574 | A1* | 5/2012 | Boeck | H01L 23/49816 257/660 |
| 2012/0202560 | A1* | 8/2012 | Donaldson | H04M 1/6066 455/552.1 |
| 2013/0050056 | A1* | 2/2013 | Lee | H01Q 1/2291 343/893 |
| 2013/0113657 | A1* | 5/2013 | Behbahani | H01Q 25/00 342/373 |
| 2013/0147664 | A1* | 6/2013 | Lin | 342/372 |
| 2013/0257680 | A1* | 10/2013 | Nix et al. | 343/876 |

(Continued)

*Primary Examiner* — Golam Sorowar

(74) *Attorney, Agent, or Firm* — Hickman Palermo Becker Bingham LLP; Edward A. Becker

(57) ABSTRACT

An apparatus for reducing interference and improving communication quality for RF communications over mm-wave frequency bands between wireless communications devices. In one embodiment, for example, the apparatus comprises a plurality of high-gain directional antenna elements each configured to maximally radiate in different directions relative to the apparatus. The apparatus also includes a RFIC chip electrically coupled to the plurality of antenna elements and configured to switch from driving any one of the directional antenna elements to driving another of the directional antenna elements thereby providing a multi-directional or near omni-directional radiation capability for a wireless communications device.

15 Claims, 6 Drawing Sheets

(56) References Cited

U.S. PATENT DOCUMENTS

| | | | | |
|---|---|---|---|---|
| 2013/0293420 | A1* | 11/2013 | Yehezkely | 342/372 |
| 2014/0134958 | A1* | 5/2014 | Sanchez et al. | 455/73 |
| 2014/0210666 | A1* | 7/2014 | Maltsev et al. | 342/368 |

* cited by examiner

APPARATUS WITH MULTI-DIRECTIONAL RADIATION CAPABILITY USING MULTIPLE ANTENNA ELEMENTS

FIELD OF THE INVENTION

The disclosed technologies relate generally to radio frequency integrated circuit (RFIC) packages, and more particularly, to RFIC packages that have at least one antenna element and an RFIC chip for driving the antenna element.

BACKGROUND

The availability of unlicensed millimeter wave (mm-wave) radio frequency (RF) bands is spurring the development of main stream applications that use mm-wave wireless technologies. For example, the Institute of Electrical and Electronics Engineers (IEEE) 802.11ad standard—also known as Wi-Gig to consumers—promises up to approximately 7 Gigabits per second data rate over the 60 GHz frequency band for consumer applications such as wireless transmission of high-definition video.

Communication over mm-wave frequency bands can be implemented in wireless communications devices by a RFIC package soldered to a printed circuit board of the device. The RFIC package typically comprises an RFIC chip and an array of non-directional antenna elements used for wireless communications with another mm-wave transceiver.

Unfortunately, mm-wave frequency bands are associated with severe path loss and high inter-symbol interference. To reduce interference and improve communication quality, beamforming techniques are usually used to simulate a directional antenna. Beamforming is typically implemented with an RFIC chip that has phase shifting capabilities of the signal fed to each non-directional antenna array element in order to electronically point the simulated antenna toward a RF signal source. Unfortunately, including phase shifting capabilities for beamforming can significantly increase the size, cost, and complexity of the RFIC chip.

It would be desirable to have a solution for reducing interference and improving communication quality over mm-wave frequency bands that does not incur the size, cost, and complexity disadvantages associated with including phase shifting capabilities for beamforming in RFIC chips.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The above deficiencies and other problems associated with RFIC packages for wireless communications devices are reduced or eliminated by the disclosed apparatus.

In one aspect of the invention, the apparatus includes a plurality of directional antenna elements including a first directional antenna element configured to maximally radiate in a first direction relative to the apparatus and a second directional antenna element configured to maximally radiate in a second different direction relative to the apparatus. The apparatus further includes a radio frequency integrated circuit chip electrically coupled to the plurality of antenna elements and configured to switch from driving any one of the first antenna element and the second antenna element to driving the other of the first antenna element and the second antenna element.

In another aspect of the invention, the apparatus includes a first patch antenna element configured to maximally radiate in a first direction relative to the apparatus, a second patch antenna element configured to maximally radiate in a second direction relative to the apparatus, and an end fire antenna element configured to maximally radiate in a third direction relative to the apparatus. The first, second, and third directions are all different directions. The apparatus further includes a radio frequency integrated chip electrically coupled to the first patch antenna element, the second patch antenna element, and the end fire antenna element and configured to switch from driving any one of the first patch antenna element, the second patch antenna element, or the end fire antenna element to driving a different one of the first patch antenna element, the second patch antenna element, or the end fire antenna element.

In another aspect of the invention, the apparatus includes a first end fire antenna element configured to maximally radiate in a first direction relative to the package, a second end fire antenna element configured to maximally radiate in a second direction relative to the package, a third end fire antenna element configured to maximally radiate in a third direction relative to the package, and a fourth end fire antenna element configured to maximally radiate in a fourth direction relative to the package. The first, second, third, and forth directions are all different directions. The apparatus further includes a radio frequency integrated chip electrically coupled to the first end fire antenna element, the second end fire antenna element, the third end first antenna element, and the fourth end fire antenna element and configured to switch from driving any one of the first end fire antenna element, the second end fire antenna element, the third end first antenna element, or the fourth end fire antenna element to driving a different one of the first end fire antenna element, the second end fire antenna element, the third end fire antenna element, or the fourth end fire antenna element.

In another aspect of the invention, a method is performed by a wireless communications device comprising a switched antenna apparatus having a plurality of antenna elements and a radio frequency integrated circuit (RFIC) chip for switching therebetween. The method comprises the steps of: selecting, at a first time, a first antenna element of the plurality of antenna elements to use for radio frequency (RF) communications with another wireless communications device; at a second time that is after the first time, selecting a second antenna element of the plurality of antenna elements to use for RF communications with the other wireless communications device and de-selecting the first antenna element to use for RF communications with the other device; and at a third time that is after the second time, selecting a third antenna element of the plurality of antenna elements to use for RF communications with the other device and de-selecting the second antenna element to use for RF communications with the other device. The first antenna element, the second antenna element, and the third antenna element are configured to maximally radiate in different directions relative to the wireless communications device.

The disclosed embodiments provide a more cost effective way to include multi-directional mm-wave frequency band communications capabilities in wireless communications devices, which can be especially important for consumergrade mobile wireless communications devices that have sensitive price points and can be physically orientated different directions.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION

Figure 1:
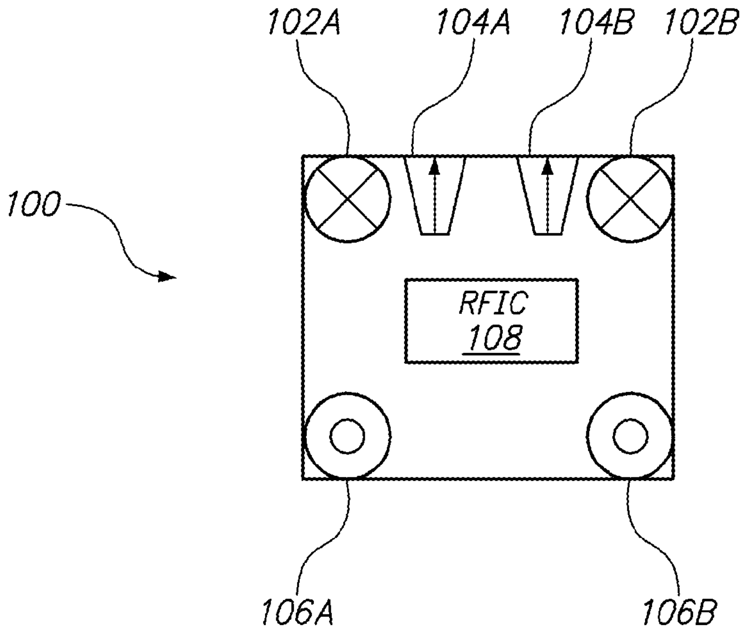
FIG. 1 is a block diagram of an example of different antenna elements radiating in different directions in the same RFIC antenna package.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It should be understood that, although the terms first, second, etc. may be used herein to describe various elements, these elements should not be limited by these terms. These terms are only used to distinguish one element from another. For example, a first antenna element could be termed a second antenna element, and similarly, a second antenna element could be termed a first antenna element, without departing from the scope of the present invention.

The terminology used in the description of the invention herein is for the purpose of describing particular embodiments only and is not intended to be limiting of the invention. As used in the description of the invention and the appended claims, the singular forms “a”, “an”, and “the” are intended to include the plural forms as well, unless the context clearly indicates otherwise. It will also be understood that the term “and/or” as used herein refers to and encompasses any and all possible combinations of one or more of the associated listed items. It will further be understood that the terms “comprises” and/or “comprising”, when used in this specification, specify the presence of stated features, integers, steps, operations, elements, and/or components, but do not preclude the presence or addition of one or more other features, integers, steps, operations, elements, components, and/or groups thereof.

I. Overview

Embodiments of an apparatus for reducing interference and improving communication quality for RF communications over mm-wave frequency bands between mm-wave transceivers is disclosed. In one embodiment, for example, the apparatus comprises a plurality of high-gain directional antenna elements each configured to maximally radiate in different directions relative to the apparatus. The apparatus also includes a RFIC chip electrically coupled to the plurality of antenna elements and configured to switch from driving any one of the directional antenna elements to driving another of the directional antenna elements.

The plurality of antenna elements can be positioned and oriented on the apparatus to provide a multi-directional or near omni-directional radiation capability for a wireless communications device. The switching capabilities of the RFIC chip allows a device application to switch between the various antenna elements and select the best one for use in communicating with another RF transceiver under the current communications conditions which can vary depending on the physical orientation of the device and other conditions. Further, the switching solution can save device power by driving only the selected antenna element during communications, which can be especially beneficial for battery-operated devices.

II. Switched Antenna Package

Attention is now directed towards embodiments of the apparatus. In some embodiments, the apparatus is a switched RFIC antenna package comprising a plurality of antenna elements and an RFIC chip for switching between the antenna elements. The plurality of antenna elements are placed on the switched antenna package to maximally radiate in different directions relative to the package. Further, different types of antenna elements may be used to realize different radiation patterns. The overall effect of having a plurality of antenna elements oriented on the switched antenna package to maximally radiate in different directions is to provide a 360 degree or near 360 degree antenna radiation coverage capability for a wireless communications device that incorporates the package.

FIG. 1 is a block diagram of an example switched RFIC antenna package 100 according to an embodiment. In this example, switched antenna package 100 includes a plurality of antenna elements 102, 104, and 106 positioned and oriented on the package 100 to maximally radiate in different directions and a RFIC chip 108 for switching between the various antenna elements 102, 104, and 106. Antenna package 100 may include other components and elements, depending upon the requirements of the particular implementation at hand, and antenna package 100 is not limited to any particular components or elements. Example implementations for switched antenna package 100 include, without limitation, a RF receiver, a RF transmitter, or a RF transceiver.

While in some embodiments the plurality of antenna elements are located within the switched antenna package, the plurality of antenna elements are located external to the switched antenna package in other embodiments. For example, antenna elements 102, 104, and 106 may be located on a printed circuit board external to package 100 that includes RFIC chip 108.

The plurality of antenna elements can be any type of directional antenna that may vary depending on the requirements of the particular implementation at hand. However, the plurality of antenna elements may be placed within the switched antenna package (or on the printed circuit board as the case may be) so as to maximally radiate in different directions relative to the package when driven by the RFIC chip.

In the example package 100, antenna element 102 is a patch antenna element pointing downward relative to package 100 and configured to maximally radiate in a substantially downward vertical direction relative to package 100. Antenna element 104 is a Vivaldi end fire antenna element pointing forward relative to package 100 and configured to maximally radiate in a substantially horizontal direction relative to package 100. Antenna element 106 is another patch antenna element pointing upward relative to package 100 and configured to maximally radiate in a substantially upward vertical direction relative to package 100. For expository purposes, the term "horizontal" refers to a plane parallel to a switched antenna package regardless of the orientation of the package. The term "vertical" refers to a plane perpendicular to the horizontal as just defined. Terms, such as "upward", "downward", "above", "below", "bottom", "top", "forward", "backward", "left", and "right" are defined with respect to the horizontal plane.

In the example package 100, each antenna element 102, 104, and 106 comprises separate transmit and receive antennas designated as "A" and "B" respectively. However, each of the plurality of antenna elements can include just a receive antenna, just a transmit antenna, separate transmit and receive antennas, or a combined transmit and receive antenna, according to the requirements of the particular implementation at hand.

The plurality of antenna elements 102, 104, and 106 when driven by RFIC chip 108 maximally radiate in certain directions. The direction of maximum radiation for an antenna element is a direction in which the antenna element has its highest gain, for example, as measured as decibels over isotropic (dBi). A higher gain antenna generally provides better link budget than a lower gain antenna but suffers from increased directionally relative to the lower gain antenna. At mm-wave frequencies, each of the high-gain directional antenna elements 102, 104, and 106 may have a gain of approximately 6 dBi and an antenna beam width of approximately seventy (70) degrees, for example. In contrast, each of the low-gain antenna elements used in a beamforming array at mm-wave frequencies may have a gain of approximately 2 dBi and an antenna beam width of approximately 120 degrees, for example.

Package 100 retains the benefits of better link budgets provided by high-gain directional antenna elements 102, 104, and 106 without suffering the drawbacks of associated increased directionally by switching between the various antenna elements 102, 104, and 106 to the antenna element 102, 104, or 106 that provides the best communication quality under the current communications conditions (e.g., the current physical orientation of the package 100 relative to another mm-wave transceiver).

While in the example package 100, antenna elements 102 and 106 are patch antenna elements and antenna element 104 is a Vivaldi end fire antenna element, the antenna elements 102, 104, and 106 can be other types of antenna elements depending on the requirements of the particular implementation at hand. For example, each of antenna elements 102, 104, and 106 could be the same or different one of a monopole antenna, a dipole antenna, a Yagi antenna, a log periodic dipole antenna, a slot antenna, an annular slot antenna, another type of Vivaldi antenna, or an antenna array thereof. Further, the antenna elements that are used are not limited to a particular polarization and each of the antenna elements 102, 104, and 106 can be linearly, elliptically, or circularly polarized according to the requirements of the particular implementation at hand. Further still, while three antenna elements are used in the example package 100. More or fewer antenna elements, and/or different types of antenna elements, may be used in other embodiments to realize antenna radiation coverage in more of fewer directions.

Although not shown in FIG. 1, antenna elements 102, 104, and 106 are connected to RFIC chip 108 via feed lines. Each feed line may have a specified feed line length. As used herein, the term "feed line length" refers to a length of a feed line from an antenna element to a RFIC chip. A feed line length may be determined by the physical characteristics of the electrical connection between an antenna element and the RFIC chip, such as dimensional length of the connection and materials used to fabricate the connection. For example, a first antenna element may have a feed line length of 3 millimeters and a second antenna may have a feed line length of 4 millimeters. Alternatively, each of the antenna elements may have the same feed line length. The feed line length may also be affected by surrounding structures and materials. For example, an effective feed line length may be changed by exposing portions of an antenna feed line to a ground plane, e.g., via cutouts or "windows" in an underlying insulating material.

Similarly, to reduce obstruction of the radiation of certain antenna elements pointed toward a ground plane, cutouts or windows may be made in the ground plane. For example, ground plane cutouts or windows may be made for downward pointing antenna element 102. Alternatively, the package 100 (or antenna element 102) may be placed on a printed circuit board of a wireless communications device at a location where the radiation of the antenna element 102 is not obstructed or is only minimally obstructed by a ground plane such as, for example, near or overhanging an edge of the printed circuit board.

Figure 2A:
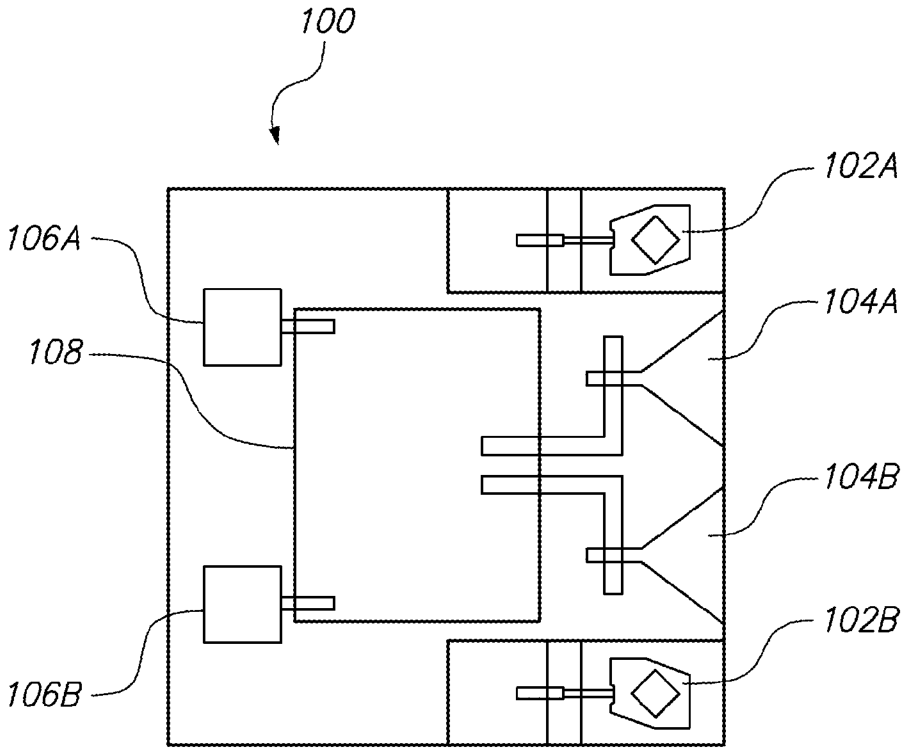
FIG. 2A is a top view of the example RFIC antenna package of FIG. 1.
Figure 2B:
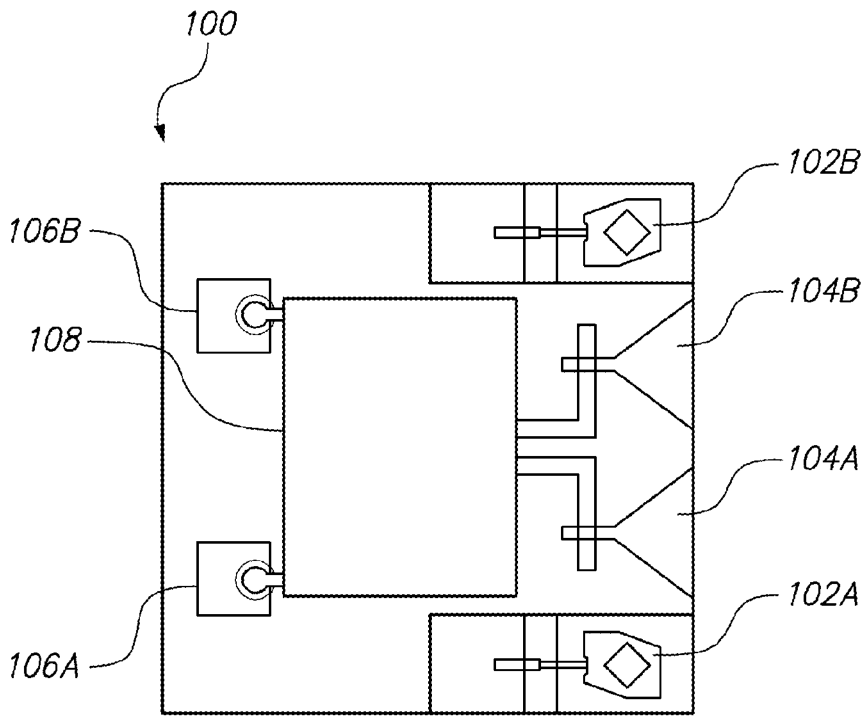
FIG. 2B is a bottom view of the example RFIC antenna package of FIG. 1.
Figure 2C:
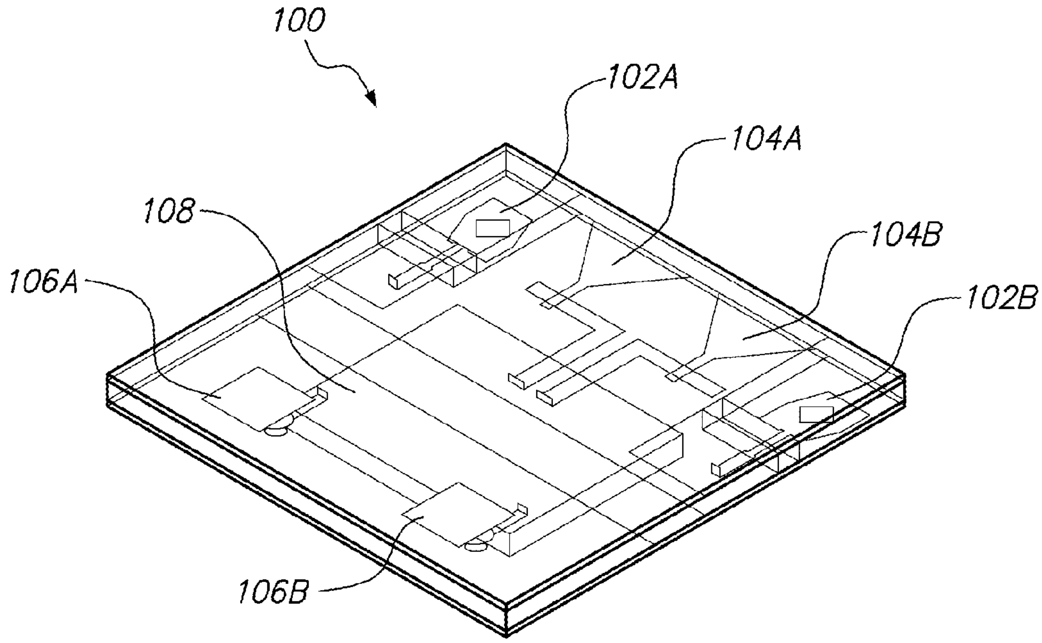
FIG. 2C is a top perspective view of the example RFIC antenna package of FIG. 1.
Figure 2D:
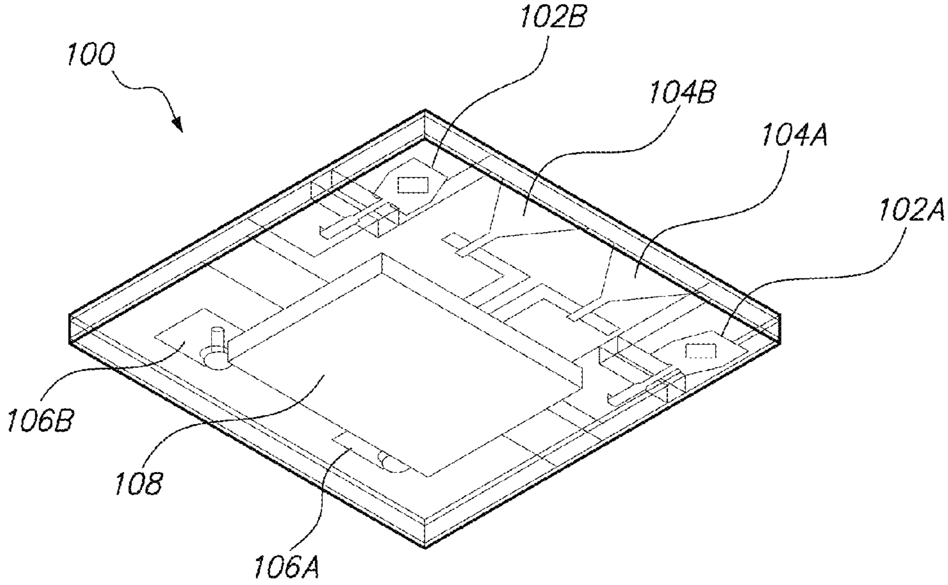
FIG. 2D is a bottom perspective view of the example RFIC antenna package of FIG. 1.

FIGS. 2A, 2B, 2C, and 2D provide some schematic views of a realized packaging for the switched antenna package 100 of FIG. 1. In particular, FIG. 2A is a top schematic view of the realized packaging, FIG. 2B is a bottom schematic view of the realized packaging, FIG. 2C is a top perspective schematic view of the realized packaging, and FIG. 2D is a bottom perspective schematic view of the realized packaging. As can be seen in FIGS. 2A, 2B, 2C, and 2D, there are substantially square window cutouts of the ground plane to reduce obstruction of the radiation from downward pointing antenna element 102.

Figure 3A:
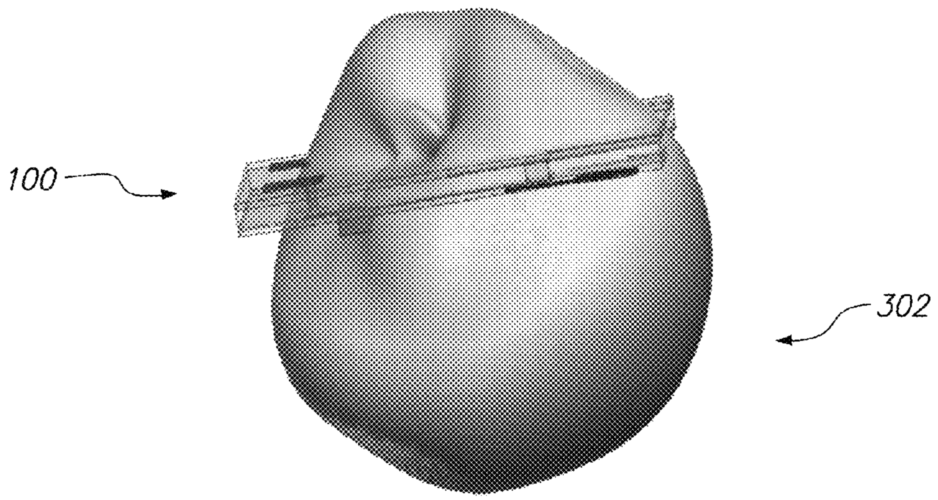
FIG. 3A is a three-dimensional radiation pattern plot when the downward pointing patch antenna element of the example RFIC antenna package of FIG. 1 is being driven and the other antenna elements are not being driven.
Figure 3B:
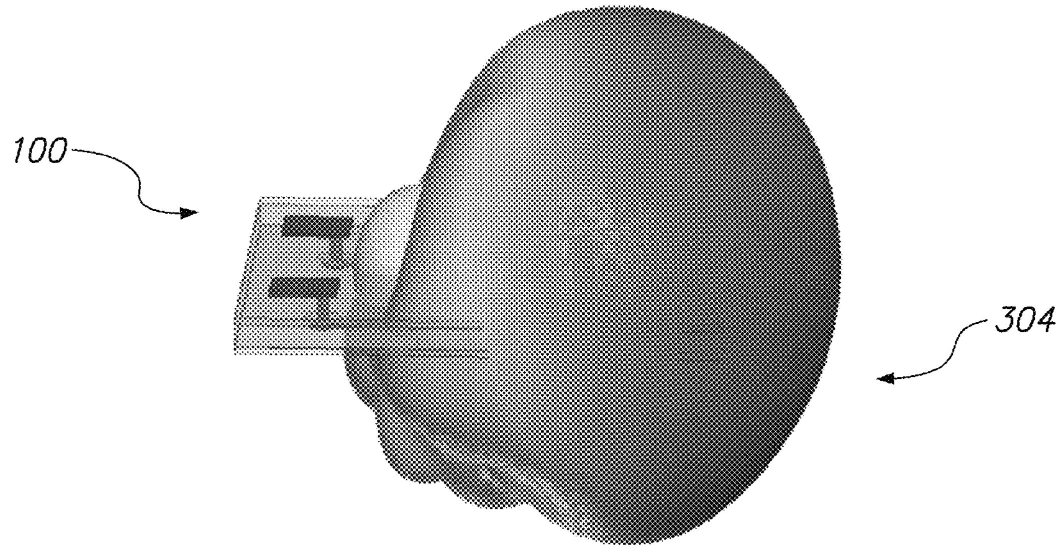
FIG. 3B is a three-dimensional radiation pattern plot when the forward pointing end fire antenna element of the example RFIC antenna package of FIG. 1 is being driven and the other antenna elements are not being driven.
Figure 3C:
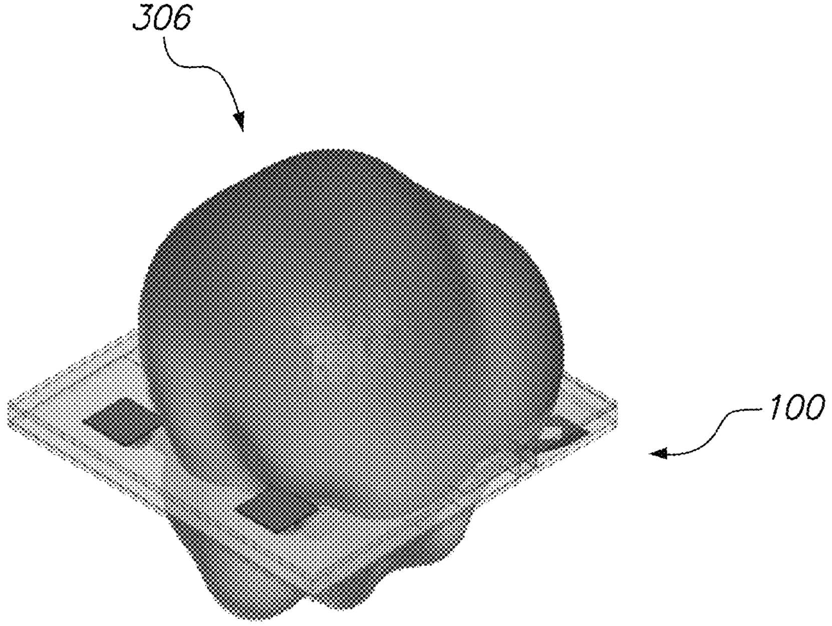
FIG. 3C is a three-dimensional radiation pattern plot when the upward pointing patch antenna element of the example RFIC antenna package of FIG. 1 is being driven and the other antenna elements are not being driven.

FIGS. 3A, 3B, and 3C are three-dimensional radiation pattern plots of the antenna elements 102, 104, and 106 of the realized packaging for the switched antenna package 100 of FIG. 1, respectively. In particular, FIG. 3A is a three-dimensional radiation pattern plot 302 when the downward pointing patch antenna element 102 is being driven and the other antenna elements 104 and 106 are not being driven. As can be seen, the downward pointing patch antenna element 102 maximally radiates in a substantially downward vertical direction relative to the package 100. FIG. 3B is a three-dimensional radiation pattern plot 304 when the forward pointing end fire antenna element 104 is being driven and the other antenna elements 102 and 106 are not being driven. As can be seen, the forward pointing end fire antenna element 104 maximally radiates in a substantially forward horizontal direction relative to the package 100. FIG. 3C is a three-dimensional radiation pattern plot 306 when the upward pointing patch antenna element 106 is being driven and the other antenna elements 102 and 104 are not being driven. As can be seen, the upward pointing patch antenna element 106 maximally radiates in a substantially upward vertical direction relative to the package 100. Thus, depending on which antenna element 102, 104, and 106 is being driven, the package 100 can be used for mm-wave frequency band communications with another mm-wave transceiver in at least three different directions.

Figure 4:
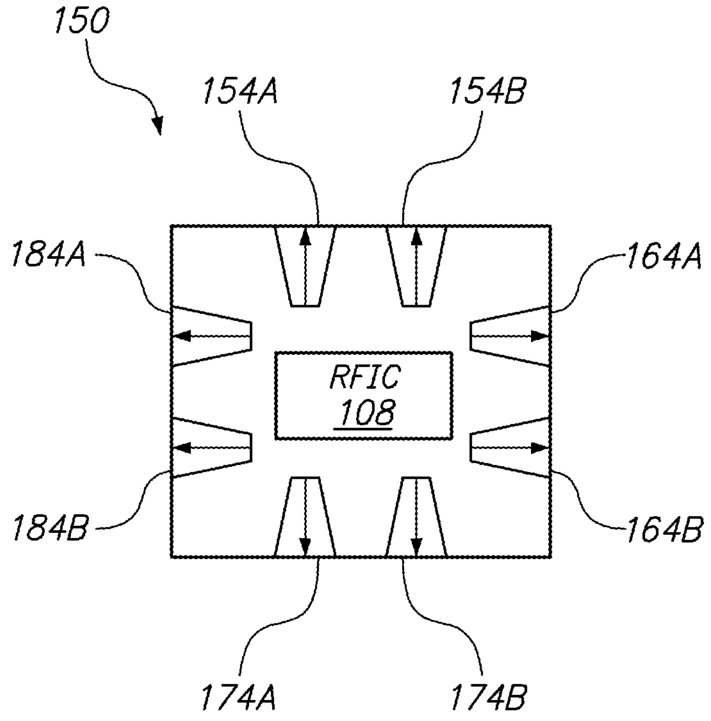
FIG. 4 is a block diagram of different antenna elements radiating in predominately horizontal directions in the same RFIC antenna package.

FIG. 4 is a block diagram of an alternative switched antenna package 150 comprising only Vivaldi end fire antenna elements 154, 164, 174, and 184 and RFIC chip 108. The end fire antenna elements are each configured to maximally radiate in substantially horizontal directions. In particular, end fire antenna element 154, like end fire antenna element 104 of package 100, is configured to radiate in a substantially forward direction. End fire antenna element 164 is configured to radiate substantially right, end fire antenna element 184 substantially left, and end fire antenna element 174 in a substantially backward direction. The antenna element configuration of package 150 may be appropriate for certain types of wireless communications devices such as, for example, devices that are typically physically oriented horizontally such as when lying flat on a table or other horizontal surface.

III. Antenna Switching

According to one embodiment, antenna elements of a switched antenna apparatus are selected for use and/or de-selected for use to achieve a desired radiation pattern, shape, and/or direction. As used herein, the term "selected for use" refers to selecting an antenna element to be used for transmission and/or reception of electromagnetic radiation and the term "de-selected for use" refers to selecting an antenna element to not be used for transmission and/or reception of electromagnetic radiation. For example, selecting an antenna element for use may include activating a power amplifier that drives the selected antenna element and de-selecting for use may include de-activating a power amplifier that drives the de-selected antenna element.

Antenna element selection may be accomplished using a wide variety of techniques that may vary depending upon a particular architecture and implementation. For example, RFIC chip 108 may be configured to use low noise amplifier (LNA) bank outputs to select and de-select corresponding receiving antenna elements. RFIC chip 108 may be configured with hardware and/or software interfaces, e.g., application program interfaces (APIs), to allow other components and software processes, either within or external to the switched antenna apparatus, to issue commands to RFIC chip 108 to select and de-select antenna elements for use. For example, participant devices in communication with the switched antenna apparatus may issue commands to RFIC chip 108 to select and de-select antenna elements for use.

In some implementations, if an antenna is a transmit antenna, then the antenna may be connected to a power amplifier of the RFIC chip 108, and/or if the antenna is a receive antenna, then the antenna may be connected to a low noise amplifier of the RFIC chip 108. In these implementations, the RFIC chip 108 can select and de-select an antenna for use in several different ways. For example, the RFIC chip 108 can turn the biasing (power supply) on for a given low noise amplifier to select a corresponding antenna for use, and the RFIC chip 108 can turn the biasing off for the low noise amplifier to de-select the antenna for use. Similarly, the RFIC chip 108 can turn the biasing on for a given power amplifier to select a corresponding antenna for use, and the RFIC chip 108 can turn the biasing off for the power amplifier to de-select the antenna for use. As another example, a switch circuit may be placed on the RFIC chip 108 between the low noise amplifier and the power amplifier corresponding to an antenna. In this implementation, the switch circuit may be used to select and de-select the antenna for use without manipulating the biasing of the low noise amplifier or the power amplifier.

Figure 5:
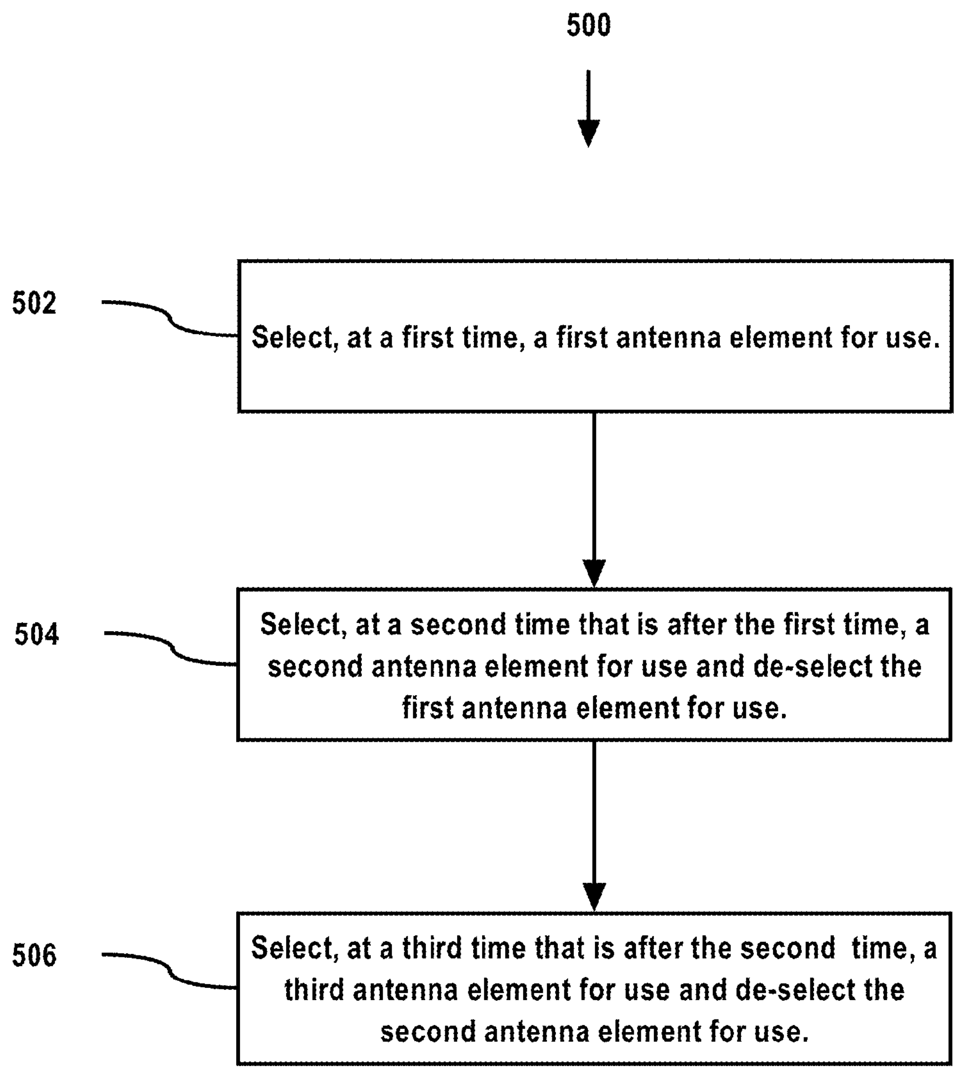
FIG. 5 is a flow diagram that depicts an approach for a switched antenna apparatus to switch between different antenna elements according to an embodiment.

FIG. 5 is a flow diagram 500 that depicts an approach for a switched antenna apparatus to switch between (drive) different antenna elements according to an embodiment. In step 502, at a first time, a first antenna element is selected for use. For example, RFIC chip 108 of package 100 may select antenna element 102 for use and optionally de-select antenna elements 104 and/or 106 for use, depending upon whether antenna elements 104 and/or 106 were previously selected for use. The radiation pattern of the first antenna element predominately radiates in a certain direction and with a certain beam width. For example, the first antenna element may radiate in a predominately downward vertical direction with an approximately seventy (70) degree beam width, as depicted in FIG. 3A.

In step 504, at a second time that is after the first time, a second antenna element is selected for use. For example, RFIC chip 108 may select antenna element 104 for use and de-select antenna element 102 for use. Since antenna element 106 was previously de-selected for use, a command does not necessarily need to be issued to de-select antenna element 106 for use. Whether optional commands are issued may depend upon a particular implementation. For example, in some implementations, a command may be issued to select or de-select a particular antenna element for use, regardless of whether the particular antenna element is already selected or de-selected for use. The radiation pattern of the second antenna element predominately radiates in a certain direction and with a certain beam width. For example, the second antenna element may radiate in a predominately forward horizontal direction with an approximately seventy (70) degree beam width, as depicted in FIG. 3B.

In step 506, at a third time that is after the second time, a third antenna element is selected for use. For example, RFIC chip 108 of package 100 may select antenna element 106 for use and optionally de-select antenna element 104 for use. The radiation pattern of the third antenna element predominately radiates in a certain direction and with a certain beam width. For example, the third antenna element may radiate in a predominately upward vertical direction with an approximately seventy (70) degree beam width, as depicted in FIG. 3C.

Not all of these steps 502, 504, and 506 are required and additional steps may be performed, depending upon a particular implementation. As one example, steps 504 and 506 may be optional in that only one of the antenna elements may be used for an entire communications session. Further, antenna elements may be re-selected for use after being selected for use. For example, in step 506, instead of selecting a third antenna element for use, the first antenna element selected in step 502 may be re-selected for use.

Antenna element switching as described herein may be employed at any phase in communication, for example, during initialization of a communications system, or during active communications sessions. In addition, after an initial antenna element has been selected, a different antenna element may be selected at any time, for example, to accommodate a change in position of communication participants. For example, at a first time, a first antenna element may be selected for communications between a first participant and a second participant and at a second time that is different than the first time, a second antenna element may be selected for communications between the first participant and the second participant.

An antenna element may be selected based upon the particular participants participating in communications. For example, a first antenna element may be selected for communications between a first participant and a second participant and a second antenna element may be selected for communications between the first participant and a third participant, where the second and third participants are different participants. An antenna element may be selected based upon whether a device is transmitting or receiving signals. For example, a first antenna element may be selected for transmission and a different antenna element may be selected for reception.

Embodiments are described herein in the context of three and four antenna elements for purposes of explanation only and embodiments are applicable to switched antenna arrangements using any number of antenna elements. Antenna arrangements with a greater number of antenna elements may be used to increase the directionality of the apparatus or optimize for certain directions. For example, package 100 comprises three antenna elements 102, 104, and 106 for optimizing RF communications with another wireless communications device in the upward, downward, and forward directions while package 150 comprises four antenna element 154, 164, 174, and 184 for optimizing RF communications in the forward, backward, left, and right directions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus comprising:

a plurality of directional antenna elements comprising a first directional antenna element having a first gain and being configured to maximally radiate at a first specified beam width in a first direction relative to the apparatus and a second directional antenna element having a second gain and being configured to maximally radiate at a second specified beam width in a second direction relative to the apparatus that is different than the first direction, wherein the second gain is different than the first gain and the second specified beam width is different than the first specified beam width;

a radio frequency integrated circuit chip electrically coupled to the plurality of antenna elements and configured to switch from driving the first antenna element having the first gain and the first specified beam width to driving the second antenna element having the second gain and the second specified beam width;

one or more logic components coupled to the radio frequency integrated circuit chip and configured to:

detect a change in a physical orientation of the apparatus relative to another apparatus in communication with the apparatus and to command the radio frequency integrated circuit chip to switch from driving the first antenna element having the first gain and first specified beam width to driving the second antenna element having the second gain and second specified beam width in response to detecting the change in the physical orientation of the apparatus relative to the other apparatus, and command the radio frequency integrated circuit chip to switch from driving the first antenna element having the first gain and first specified beam width to driving the second antenna element having the second gain and second specified beam width in response to a change of participants participating in the communication with the apparatus and the another apparatus;

wherein the apparatus is a mobile wireless communications device comprising a printed circuit board and a radio frequency integrated circuit package on the printed circuit board.

2. The apparatus of claim 1, wherein the first antenna element is a patch antenna element and the second antenna element is an end fire antenna element.

3. The apparatus of claim 1, wherein the first direction is a substantially horizontal direction relative to the apparatus and the second direction is a substantially vertical direction relative to the apparatus.

4. The apparatus of claim 1, wherein the first and second antenna elements each comprise separate receive and transmit antennas.

5. The apparatus of claim 1:

wherein the first directional antenna element is a first patch antenna element configured to maximally radiate in the first direction relative to the apparatus;

wherein the second directional antenna element is a second patch antenna element configured to maximally radiate in the second direction relative to the apparatus that is different than the first direction;

wherein the plurality of antenna elements comprises an end fire antenna element configured to maximally radiate in a third direction relative to the apparatus that is different from the first direction and the second direction;

wherein the radio frequency integrated chip is electrically coupled to the first patch antenna element, the second patch antenna element, and the end fire antenna element and is configured to switch from driving any one of the first patch antenna element, the second patch antenna element, or the end fire antenna element to driving a different one of the first patch antenna element, the second patch antenna element, or the end fire antenna element.

6. The apparatus of claim 5, wherein the apparatus comprises a radio frequency integrated circuit package, the package comprising the first patch antenna element, the second patch antenna element, the end fire antenna element, and the radio frequency integrated circuit chip.

7. The apparatus of claim 5, wherein the first direction is a substantially vertical direction relative to the apparatus, the second direction is a direction substantially opposite the first direction, and the third direction is a substantially horizontal direction relative to the apparatus.

8. The apparatus of claim 5, wherein the first patch antenna element, the second patch antenna element, and the end fire antenna element each comprise separate transmit and receive antennas.

9. The apparatus of claim 1:

wherein the first directional antenna element is a first end fire antenna element configured to maximally radiate in the first direction relative to the apparatus;

wherein the second directional antenna element is a second end fire antenna element configured to maximally radiate in a second direction relative to the apparatus;

wherein the plurality of antenna elements comprises a third end fire antenna element configured to maximally radiate in a third direction relative to the apparatus;

wherein the plurality of antenna elements comprises a fourth end fire antenna element configured to maximally radiate in a fourth direction relative to the apparatus;

wherein the first, second, third, and forth directions are all different from each other;

wherein the radio frequency integrated chip is electrically coupled to the first end fire antenna element, the second end fire antenna element, the third end first antenna element, and the fourth end fire antenna element and is configured to switch from driving any one of the first end fire antenna element, the second end fire antenna element, the third end first antenna element, or the fourth end fire antenna element to driving a different one of the first end fire antenna element, the second end fire antenna element, the third end first antenna element, or the fourth end fire antenna element.

10. The apparatus of claim 9, wherein the apparatus comprises a radio frequency integrated circuit package, the package comprising the first end fire antenna element, the second end fire antenna element, the third end fire antenna element, and the fourth end fire antenna element.

11. The apparatus of claim 9, wherein the first direction is a substantially horizontal direction relative to the apparatus, the second direction is a direction substantially opposite the first direction, the third direction is a direction substantially perpendicular to the first direction, and the fourth direction is a direction substantially opposite the third direction.

12. The apparatus of claim 9, wherein the first, second, third, and fourth end fire antenna elements each comprise separate transmit and receive antennas.

13. The apparatus of claim 1, wherein at least one of the one or more logic components is implemented in software.

14. The apparatus of claim 1, wherein the one or more logic components are configured to command the radio frequency integrated circuit chip to switch from driving a currently selected one of the first antenna element or the second antenna element to driving the other of the first antenna element or the second antenna element via an application programming interface to the radio frequency integrated circuit chip.

15. A mobile wireless communications device comprising:

a printed circuit board;

a radio frequency integrated circuit package on the printed circuit board; and one or more logic components;

wherein the radio frequency integrated circuit package comprises:

a plurality of directional antenna elements comprising a first directional antenna element having a first gain and being configured to maximally radiate at a first specified beam width in a first direction relative to the apparatus and a second directional antenna element having a second gain and being configured to maximally radiate at a second specified beam width in a second direction relative to the apparatus that is different than the first direction, wherein the second gain is different than the first gain and the second specified beam width is different than the first specified beam width, and a radio frequency integrated circuit chip electrically coupled to the plurality of antenna elements and configured to switch from driving the first antenna element having the first gain and the first specified beam width to driving the second antenna element having the second gain and the second specified beam width;

wherein the one or more one or more logic components are coupled to the radio frequency integrated circuit chip and are configured to:

detect a change in the physical orientation of the mobile wireless communications device relative to another mobile wireless communications device and command the radio frequency integrated circuit chip to switch from driving the first antenna element having the first gain and the first specified beam width to driving the second antenna element having the second gain and the second specified beam width in response to detecting the change in the physical orientation of the mobile wireless communications device relative to the other mobile wireless communications device, and command the radio frequency integrated circuit chip to switch from driving the first antenna element having the first gain and first specified beam width to driving the second antenna element having the second gain and second specified beam width in response to a change of participants participating in the communication with the mobile wireless communications and the another mobile wireless communications.

* * * * *